July 21, 1925. 1,547,038
W. E. HOLLAND ET AL
METHOD OF MAKING STORAGE BATTERY GRIDS
Filed Oct. 29, 1918   3 Sheets-Sheet 1

Inventors;
Walter F. Holland,
James M. Skinner
by their Attorneys,
Howson & Howson July 21, 1925.
W. E. HOLLAND ET AL
1,547,038
METHOD OF MAKING STORAGE BATTERY GRIDS
Filed Oct. 29, 1918  3 Sheets-Sheet 2
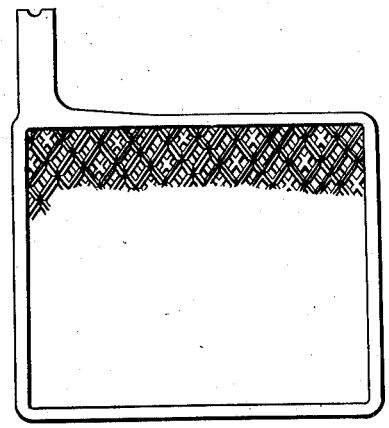
Fig. 4.
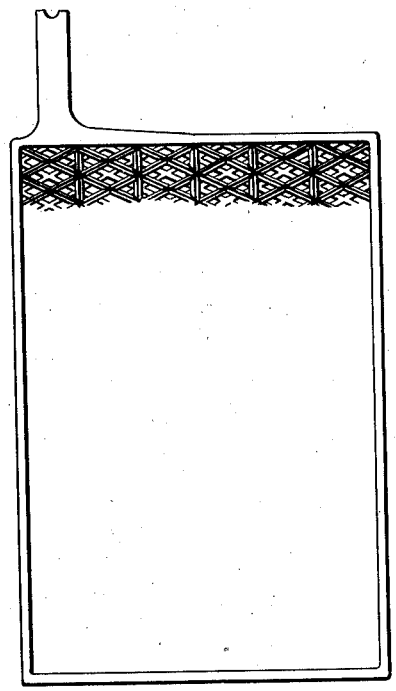
Fig. 5.
Fig. 6.
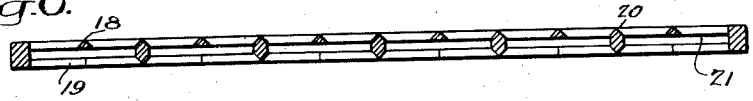
Inventors: Walter E. Holland
James M. Skinner
by their Attorneys,
Howson & Howson July 21, 1925.  1,547,038
W. E. HOLLAND ET AL
METHOD OF MAKING STORAGE BATTERY GRIDS
Filed Oct. 29, 1918   3 Sheets-Sheet 3

Inventors:
Walter E. Holland,
James M. Skinner,
by their Attorneys,
Howson & Howson Patented July 21, 1925.

1,547,038

UNITED STATES PATENT OFFICE.

WALTER E. HOLLAND AND JAMES M. SKINNER, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

METHOD OF MAKING STORAGE-BATTERY GRIDS.

Application filed October 29, 1918. Serial No. 260,194.

*To all whom it may concern:*

Be it known that we, WALTER E. HOLLAND and JAMES M. SKINNER, citizens of the United States, residing in Philadelphia, Pennsylvania, have invented the Method of Making Storage-Battery Grids, of which the following is a specification.

The supporting frames or grids of storage battery electrodes or plates are customarily made by casting a suitable lead alloy in a metal mold maintained by gas burners at such a temperature as will insure the flow of metal to all of its parts. These burners are necessarily so operated as to maintain the mold temperature at such a point that the molten metal will certainly flow to the parts of the mold most remote from the pouring gate as well as fill the channels having the smallest cross-sectional area. The resulting frames or grids, owing to conditions inherent in this method of manufacture, are of a non-uniform structure, are more or less porous, and vary in density and strength at different points. Because of this porous, non-uniform structure, the grids are attacked under conditions of use, the metal being oxidized not only on its outer surfaces but also internally, due to penetration of the electrolyte into the pores. As a consequence, in a relatively short time the integrity of the grid is seriously impaired and the useful life of the plate, of which the grid is the foundation, is shortened. Moreover, owing the unequal stresses resulting from this internal oxidation of the porous, non-uniform metal, the grids and consequently the plates made from them are found to buckle or become otherwise distorted, causing the plates to short-circuit and become inoperative in a relatively short time.

One object of this invention is to provide a novel, improved method of making grids, particularly those composed of lead alloys designed for use in storage battery plates, the invention more especially contemplating a novel succession of steps for manufacturing the grid described and claimed in our application for U. S. patent filed October 29, 1918, No. 260,192.

Another object of our invention is to provide a method of making storage battery grids which shall be of relatively high density, practically free from pores, and of uniform texture and structure throughout, with a view to preventing the internal oxidation with the consequent disintegration, uneven action and buckling which has hitherto occurred to a greater or less degree in grids as at present made and used.

Another object of the invention is to provide a method of making grids for storage battery plates, in which the metal required for strength and current carrying capacity shall occupy a smaller volume, and in which grid, therefore, there will be more room for active material.

A further object of the invention is to provide a method of making storage battery grids which, by virtue of being filled out sharply and smoothly all over, will take the active paste uniformly at all points, with the result that the faces of the finished plate are smooth and perfectly flat,—such a plate having the advantage that when assembled with the usual flat perforated or slotted rubber separators, the active material will be better held in place and the plate life lengthened due to the improved surface contact of plate and separators. Furthermore, due to the elimination of surface hollows, such a plate will obviously contain more active material for a given overall thickness.

These objects and other advantageous ends we attain as hereinafter set forth, reference being had to the accompanying drawings, in which, Figs. 1 and 2 are vertical sections of dies that may be used in carrying out our improved method;

Fig. 4 is an elevation of a finished grid;

Fig. 5 is an elevation of a finished grid of another type;

Fig. 6 is a transverse section of grid shown in Fig. 5, showing the cored spaces along the center plane of the grid;

In making a storage battery or similar grid according to one form of our invention, we form a casting of lead alloy, preferably employing for this purpose a mold such as that described and claimed in the U. S. patent of Pearson and Holland #1,329,999, dated February 3, 1920, whereby the mold faces engaged by the molten metal in the casting operation are maintained at uniformly equal and relatively low temperatures. The blank so formed would be similar in construction to the finished grid illustrated in Fig. 4 except that its frame and rib members would be somewhat thicker.

Figure 1:
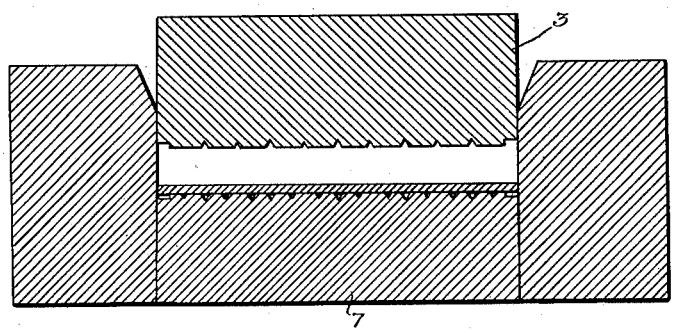
Figure 2:
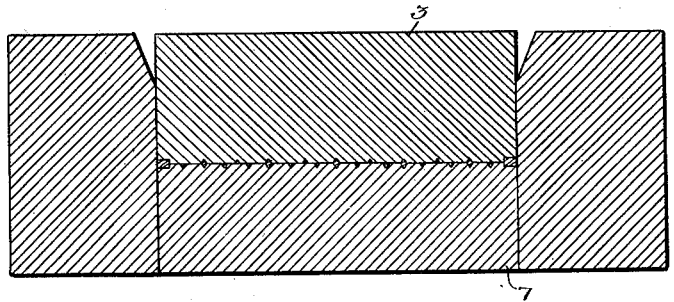
Figure 3:
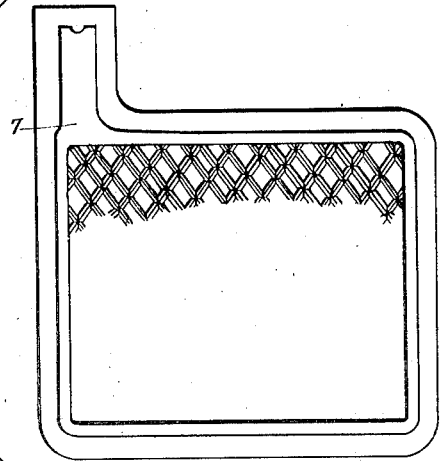
Fig. 3 is a plan of one die and the surrounding collar within which the dies operate.
Figure 8:
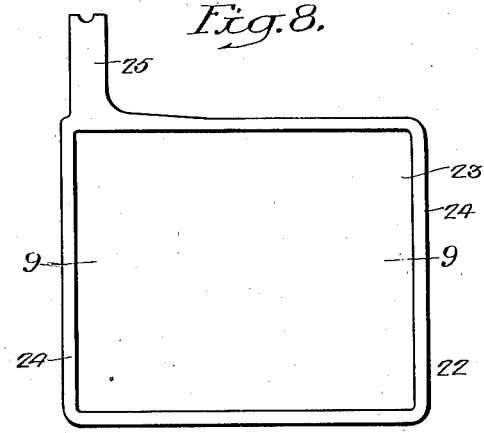
Fig. 8 is an elevation of a cast blank which may be used in carrying out one form of our invention.
Figure 9:
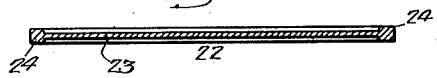
Fig. 9 is a transverse section on the line 9—9, Fig. 8.

Upon the removal of the cast grid from the mold it is placed between the dies of a press such as that shown in Figs. 1, 2 and 3. Such dies consist essentially of an upper and a lower compressing member and a collar within which such dies move in doing their work upon the cast grid—blank. The faces of the compressing dies are cut to conform with the members of the grid as cast or with the design of grid desired where a cast blank, of the form shown in Figs. 8 and 9, is used. The dies may be heated by electrical means or otherwise, although this is not necessary with certain designs of grid, and are suitably mounted in a slow-acting, powerful press, preferably of the hydraulic type.

The cast blank having been placed between the dies, is compressed when they are brought together by the operation of the press, and if desired, during such operation said dies are heated, preferably to a temperature somewhat below the melting point of the lead alloy, with a view to softening and facilitating the flow of the metal during the compressing operation. Thereafter the grid is removed from the press and any fins or webs of metal which may have been squeezed into its central plane are removed.

Owing to the heavy pressure the finished grid is found to have been rendered relatively dense, by reason of the closing of all pores and blow holes. Moreover, the volume occupied by the rib and frame members is materially decreased so that a grid having a definite weight and thickness will be capable of receiving a larger amount of active material than could be similarly applied to the same cast grid as ordinarily made. Moreover, since by reason of the great pressure employed all parts of the dies are absolutely filled by the metal of the grid, the various rib and frame elements of the latter are sharp and all terminate in the same planes on the opposite sides respectively of said grid, which is never true of a cast grid. It is therefore possible, by reason of this uniformity of thickness in all parts of the grid, to substantially increase the amount of paste applied and the resultant plate will have smooth, flat faces.

Figure 7:
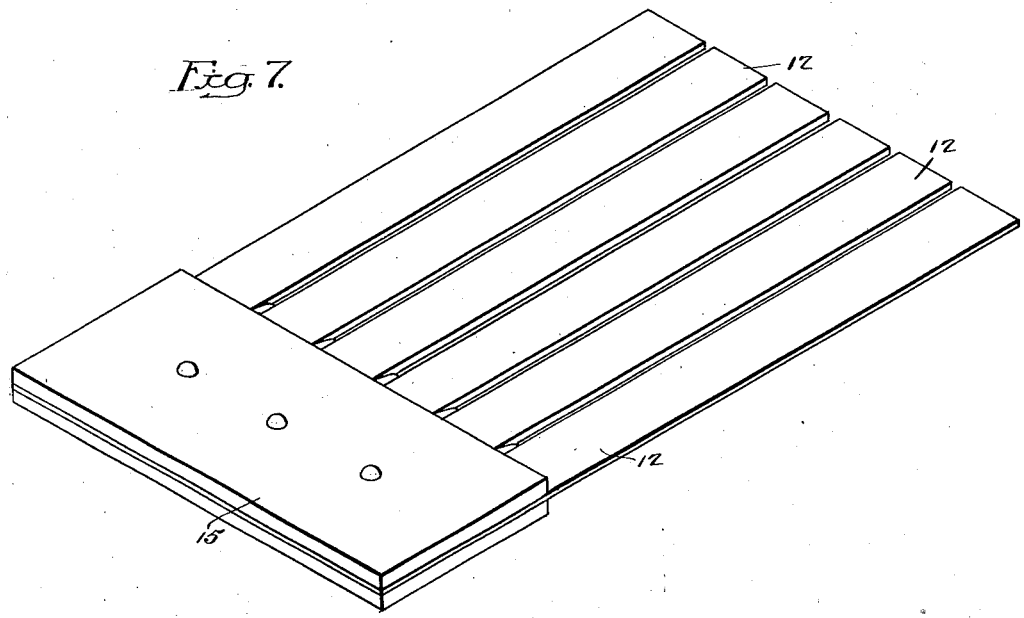
Fig. 7 is a perspective view of the plate or core piece employed in conjunction with dies in forming type of grid shown in Figs. 5 and 6.

If it is desired to make a grid such as that illustrated in Figs. 5 and 6, which includes two parallel sets of intersecting members 18 and 19 together with ribs 20 so disposed as to leave spaces 21 between said sets of members, we employ a connected series of thin plates or blades 12, Fig. 7, provided with a head 15 and placed or retained in the longitudinally extending openings of the cast grid during the compressing operation.

As an alternative method of operation we may cast or otherwise form a blank such as that illustrated at 22, Figs. 8 and 9, consisting of a relatively thin flat plate or web 23 surrounded by a materially thicker marginal frame 24 preferably having integral with it an outwardly projecting lug 25. Such a blank is placed between the two dies 3 and 7 which would be heated by any suitable means such as electric heating units, to a temperature somewhat below the melting point of the lead alloy, and upon the operation of the press, the metal of the blank is forced to flow into the various cavities of the dies. The thickness of the blank would be such that when the dies of the press have been brought together to the maximum extent, the metal of said blank completely fills the die cavities, so that the finished grid is formed of highly compressed, non-porous metal, and has a materially increased structural strength.

Figure 10:
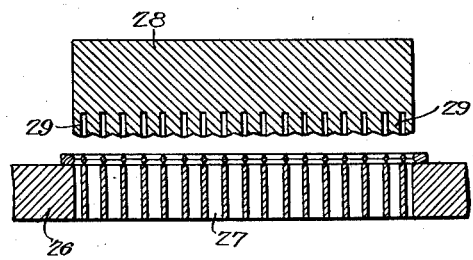
Fig. 10 is a vertical section of a punching die used in one step of our method.

In order to remove or perforate fins or webs which may remain in the spaces between the various grid members, we provide a punching machine having for instance a lower die 26 in which are vertically extending openings 27 arranged under what should be the open spaces of the grid. The upper or punching die 28 is provided with the necessary punches 29 which may be independently removable or, as shown in Fig. 10, integral with each other. These punches or cutters effectually remove or perforate the fins or webs when the grid has been properly positioned upon the lower die 26, any removed metal pieces falling through the openings of the lower member.

We claim:

1. The method of making storage battery grids which consists in casting a blank grid having substantially the shape, design and amount of metal required for the finished product; allowing the casting to solidify under conditions maintaining its opposite external faces at the same temperature; and thereafter compressing the blank to increase its density and structural strength.

2. The method of making storage battery grids which consists in casting a blank grid having substantially the shape, design and amount of metal required for the finished product; and compressing the blank to close its pores while at the same time heating it to an elevated temperature, below its fusing point.

3. The method of making storage battery grids which consists in casting a lead alloy blank under conditions insuring the maintaining of its opposite faces at the same temperature; and subjecting said blank to pressure to form a non-porous finished grid.

4. The method of making storage battery grids which consists in casting a lead alloy to form a structure of substantially the form of the finished product; and subjecting said casting to pressure and heat sufficient to soften it, to form a finished grid of reduced porosity and volume.

In witness whereof we affix our signatures.

WALTER E. HOLLAND.
JAMES M. SKINNER.